(12) United States Patent
Katsuragawa (10) Patent No.: US 9,237,500 B2
(45) Date of Patent: Jan. 12, 2016

(54) CSG TYPE BASE STATION, CONTROL PROGRAM, AND INTEGRATED CIRCUIT

(75) Inventor: Hiroshi Katsuragawa, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/127,518

(22) PCT Filed: Jun. 26, 2012

(86) PCT No.: PCT/JP2012/066238
§ 371 (c)(1),
(2), (4) Date: Dec. 19, 2013

(87) PCT Pub. No.: WO2013/002203
PCT Pub. Date: Jan. 3, 2013

(65) Prior Publication Data
US 2014/0148161 A1  May 29, 2014

(30) Foreign Application Priority Data

Jun. 27, 2011  (JP) ................................ 2011-142154

(51) Int. Cl.
*H04W 4/00* (2009.01)
*H04W 36/10* (2009.01)
(Continued)

(52) U.S. Cl.
CPC .............. *H04W 36/10* (2013.01); *H04W 48/02* (2013.01); *H04W 84/045* (2013.01)

(58) Field of Classification Search
CPC ..... H04W 48/12; H04W 48/16; H04W 48/20; H04W 48/08; H04W 12/08; H04W 4/08; H04W 60/00; H04W 88/08; H04W 76/02; H04W 8/04; H04W 8/06; H04W 84/045; H04W 48/02; H04W 36/10
See application file for complete search history.

(56) References Cited

U.S. PATENT DOCUMENTS

2009/0156208 A1* 6/2009 Vesterinen et al. ......... 455/435.1
2009/0265543 A1* 10/2009 Khetawat et al. ............. 713/151
2010/0159899 A1* 6/2010 Horn et al. .................. 455/414.1

(Continued)

OTHER PUBLICATIONS

NTT docomo, "My Area Usage Guidebook", Nov. 2010, 21 pages.

(Continued)

*Primary Examiner* — Ajit Patel
(74) *Attorney, Agent, or Firm* — Keating & Bennett, LLP (57) ABSTRACT

A user registers a desired mobile station at a desired HNB (Home Node B) in a simple operation. A CSG (Closed Subscriber Group) type base station restricts an access from a mobile station that has not been registered yet. The CSG type base station switches in response to an operation performed by a user between a standard mode that permits an access from a mobile station that has been registered in advance while restricting an access from an unregistered mobile station and a register mode that permits an access from an unregistered mobile station which intends to be registered (step S101), receives a call at a telephone number for registration from the unregistered mobile station in the register mode (step S107), extracts mobile station information including a mobile station ID of the unregistered mobile station that has placed the call, in accordance with the call received at the telephone number for registration (step S109), generates registration information by associating the mobile station information with base station information including a base station ID of a host station (step S113), and transmits the registration information to a server apparatus (step S115).

11 Claims, 8 Drawing Sheets

(51) Int. Cl.
*H04W 48/02* (2009.01)
*H04W 84/04* (2009.01)

(56) References Cited

U.S. PATENT DOCUMENTS

2010/0323741 A1* 12/2010 Leclerc et al. ............... 455/517
2011/0170517 A1* 7/2011 Bakker et al. ................ 370/331
2011/0171953 A1* 7/2011 Faccin et al. ............... 455/426.1
2011/0177814 A1* 7/2011 Buchmayer et al. ....... 455/435.1
2011/0182252 A1* 7/2011 Liu et al. ..................... 370/329
2011/0201331 A1* 8/2011 Jha et al. ..................... 455/433
2011/0218004 A1* 9/2011 Catovic et al. ............... 455/509
2012/0164980 A1* 6/2012 Van Phan et al. ............ 455/411

OTHER PUBLICATIONS

Samsung, "Verizon Wireless Network Extender User Manual", 2010, 66 pages.
Sprint, "Sprint AIRAVE User Guide", 2007, 56 pages.

* cited by examiner

CSG TYPE BASE STATION, CONTROL PROGRAM, AND INTEGRATED CIRCUIT

TECHNICAL FIELD

The present invention relates to a CSG type base station, a control program, and an integrated circuit.

BACKGROUND ART

It is contemplated that a small cell wireless communication base station covering a small zone of a size of tens of meters, such as home or office, is installed in a mobile communication system that is currently in service in a macro cell as a large cell. Such a small cell wireless communication base station device is referred to as a home base station (Home Node B: HNB).

If HNB is installed in a home or a business location, a Closed Subscriber Group (hereinafter referred to as CSG) cell is constructed in a function of the HNB that permits only a limited subscriber group, such as a family member of the home, to access the HNB.

CITATION LIST

Non Patent Literature

NPL 1: My Area Usage Guidebook, NTT docomo
NPL 2: Network Extender user manual, Verizon Wireless
NPL 3: Sprint AiraveUser Guide, Sprint Nextel

SUMMARY OF INVENTION

Technical Problem

In order to implement the CSG, a list listing information indicating which mobile station is access-permitted needs to be managed, and a registration procedures needs to be established to add to the list a mobile station that becomes newly access-permitted. Methods have been implemented in the related art. In accordance with an example of NPL 1, a mobile station is registered by a mailed written document. In accordance with an example of NPL 2, data is updated by a user on a page protected by a password on the Web. In accordance with an example of NPL 3 (though not described in detail in the document), a mobile station is added and registered via communications with an operator at a call center.

However, these methods are complicated, and input errors are likely because a user needs to write information including an ID of a mobile station and a base station ID of the HNB. Also, it takes the user time to establish access. In a company where the HNB is operated in a plurality of offices, a user, who works in another office on a temporary basis for a short period of time has difficulty in obtaining an access right. Furthermore, a large number of employees may use the HNB in an office. Since a password cannot be shared by a large number of employees, a particular administrator needs to manage the setting of the access right of all the employees. A variety of problems arise as described above, and it is difficult to manage the CSG in a flexible fashion.

In view of the above problems, the present invention has been developed. It is an object of the present invention to provide a CSG type base station, a control program, and an integrated circuit permitting a user to register a desired mobile station to a desired HNB in a simple operation.

Solution to Problem (1) To achieve the object, the present invention is constructed as described below. A CSG (Closed Subscriber Group) type base station of the present invention restricts an access from a mobile station that has not been registered yet. The CSG type base station includes a function of switching in response to an operation performed by a user between a standard mode that permits an access from a mobile station that has been registered in advance while restricting an access from an unregistered mobile station and a register mode that permits an access from an unregistered mobile station that intends to be registered, a function of receiving a call at a telephone number for registration from the unregistered mobile station in the register mode, a function of extracting mobile station information including a mobile station ID of the unregistered mobile station that has placed the call, in accordance with the call received at the telephone number for registration, and generating registration information by associating the mobile station information with base station information including a base station ID of a host station, and a function of transmitting the registration information to a server apparatus.

In this way, the CSG type base station receives the call at the telephone number for registration from the unregistered mobile station in the register mode, extracts the mobile station information including the mobile station ID of the unregistered mobile station that has placed the call, in accordance with the call received at the telephone number for registration, generates the registration information by associating the mobile station information with base station information including the base station ID of the host station, and then transmits the registration information to the server apparatus. The user can thus register a desired mobile station at a desired server apparatus in a simple operation. Also, since a security setting using a password or the like is not needed in the registration of a mobile station that has not been registered yet, user friendliness is increased.

(2) A CSG (Closed Subscriber Group) type base station of the present invention restricts an access from a mobile station that has not been registered yet. The CSG (Closed Subscriber Group) type base station includes a function of receiving a call at a telephone number for registration from an unregistered mobile station, a function of extracting, subsequent to the reception of the call, mobile station information including a mobile station ID of the unregistered mobile station that has placed the call, in accordance with the call received at the telephone number for registration, and generating registration information by associating the mobile station information with base station information including a base station ID of a host station, and a function of transmitting the registration information to a server apparatus in response to an operation performed by a user.

In this way, the CSG type base station receives the call at the telephone number for registration from the unregistered mobile station, extracts, subsequent to the reception of the call, the mobile station information including the mobile station ID of the unregistered mobile station that has placed the call, in accordance with the call received at the telephone number for registration, generates the registration information by associating the mobile station information with the base station information including the base station ID of the host station, and transmits the registration information to the server apparatus in response to the operation performed by the user. The user can thus register a desired mobile station at a desired server apparatus in a simple operation. Also, since a security setting using a password or the like is not needed in the registration of a mobile station that has not been registered yet, user friendliness is increased.

(3) The CSG type base station of the present invention includes a function of transmitting, to an administrator terminal, registration verification request information requesting registration verification prior to transmitting the registration information to the server apparatus, and a function of transmitting the registration information to the server apparatus only in response to reception of registration permit information to permit a registration from the administrator terminal.

Since the registration information is transmitted to the server apparatus only in response to the reception of registration permit information to permit the registration from the administrator terminal, security level is increased.

(4) The CSG type base station of the present invention includes a function of receiving in the register mode a call from a mobile station at a telephone number for deletion, a telephone number for verification, or a telephone number for modification, a function of extracting the mobile station information of the mobile station that has placed the call, in accordance with the call received at the telephone number for deletion, the telephone number for verification, or the telephone number of modification, and generating deletion information, verification information, or modification information by associating the mobile station information with the base station information, and a function of transmitting to the server apparatus the deletion information, the verification information, or the modification information.

In this way, the CSG type base station receives in the register mode the call from the mobile station at the telephone number for deletion, the telephone number for verification, or the telephone number for modification, extracts the mobile station information of the mobile station that has placed the call, in accordance with the call received at the telephone number for deletion, the telephone number for verification, and the telephone number of modification, generates the deletion information, the verification information, or the modification information by associating the mobile station information with the base station information, and transmits to the server apparatus the deletion information, the verification information, or the modification information. The user can thus delete, verify, or modify (modify the content of the registration) a desired mobile station at a desired server apparatus in a simple operation. Also, since a security setting using a password or the like is not needed in the registration of a mobile station that has not been registered yet, user friendliness is increased.

(5) The CSG type base station of the present invention further includes a function of receiving a call from a mobile station at a telephone number for deletion, a telephone number for verification, or a telephone number for modification, a function of extracting, subsequent to receiving the call, mobile station information of the mobile station that has placed the call, in accordance with the call received at the telephone number for deletion, the telephone number for verification, or the telephone number for modification, and generating deletion information, verification information, or modification information by associating the mobile station information with the base station information, and a function of transmitting to the server apparatus the deletion information, the verification information, or the modification information in response to an operation performed by the user.

In this way, the CSG type base station receives the call from the mobile station at the telephone number for deletion, the telephone number for verification, or the telephone number for modification, extracts, subsequent to receiving the call, the mobile station information of the mobile station that has placed the call, in accordance with the call received at the telephone number for deletion, the telephone number for verification, or the telephone number for modification, generates the deletion information, the verification information, or the modification information by associating the mobile station information with the base station information, and transmits to the server apparatus the deletion information, the verification information, or the modification information in response to the operation performed by the user. The user can thus delete, verify, or modify (modify the content of the registration) a desired mobile station at a desired server apparatus in a simple operation. Also, since a security setting using a password or the like is not needed in the registration of a mobile station that has not been registered yet, user friendliness is increased.

(6) The CSG type base station further includes a function of switching to the standard mode in a case of no reception of the call within a constant period of time subsequent to switching to the register mode.

If no call is received within the constant period of time subsequent to switching to the register mode in this way, the CSG type base station switches to the standard mode. Security level is thus increased.

(7) The CSG type base station further includes a function of stopping transmitting the registration information subsequent to receiving the call in a case of no operation performed by the user within a constant period of time subsequent to the reception of the call.

If no operation is performed by the user within the constant period of time subsequent to the reception of the call in this way, the transmission of the registration information is stopped. Security level is thus increased.

(8) A control program of the present invention is a control program of a CSG (Closed Subscriber Group) type base station that restricts an access from a mobile station that has not been registered yet. The control program causes the CSG type base station to perform a process. The process includes an operation of switching in response to an operation performed by a user between a standard mode that permits an access from a mobile station that has been registered in advance while restricting an access from an unregistered mobile station and a register mode that permits an access from an unregistered mobile station that intends to be registered, an operation of receiving a call at a telephone number for registration from the unregistered mobile station in the register mode, an operation of extracting mobile station information including a mobile station ID of the unregistered mobile station that has placed the call, in accordance with the call received at the telephone number for registration, and generating registration information by associating the mobile station information with base station information including a base station ID of a host station, and an operation of transmitting the registration information to a server apparatus.

In this way, the CSG type base station receives the call at the telephone number for registration from the unregistered mobile station in the register mode, extracts the mobile station information including the mobile station ID of the unregistered mobile station that has placed the call, in accordance with the call received at the telephone number for registration, generates the registration information by associating the mobile station information with the base station information including the base station ID of the host station, and then transmits the registration information to the server apparatus. The user can thus register a desired mobile station at a desired server apparatus in a simple operation. Also, since a security setting using a password or the like is not needed in the registration of a mobile station that has not been registered yet, user friendliness is increased.

(9) A control program of the present invention is a control program of a CSG (Closed Subscriber Group) type base station that restricts an access from a mobile station that has not been registered yet. The control program causes the CSG type base station to perform a process. The process includes an operation of receiving a call at a telephone number for registration from an unregistered mobile station, an operation of extracting, subsequent to the reception of the call, mobile station information including a mobile station ID of the unregistered mobile station that has placed the call, in accordance with the call received at the telephone number for registration, and generating registration information by associating the mobile station information with base station information including a base station ID of a host station, and an operation of transmitting the registration information to a server apparatus in response to an operation performed by a user.

In this way, the CSG type base station receives the call at the telephone number for registration from the unregistered mobile station, extracts, subsequent to the reception of the call, the mobile station information including the mobile station ID of the unregistered mobile station that has placed the call, in accordance with the call received at the telephone number for registration, generates the registration information by associating the mobile station information with the base station information including the base station ID of the host station, and transmits the registration information to the server apparatus in response to the operation performed by the user. The user can thus register a desired mobile station at a desired server apparatus in a simple operation. Also, since a security setting using a password or the like is not needed in the registration of a mobile station that has not been registered yet, user friendliness is increased.

(10) An integrated circuit of the present invention is implemented on a CSG (Closed Subscriber Group) type base station to cause the CSG type base station to perform a plurality of functions. The functions includes a function of switching in response to an operation by a user between a standard mode that permits an access from a mobile station that has been registered in advance while restricting an access from an unregistered mobile station and a register mode that permits an access from an unregistered mobile station which intends to be registered, a function of receiving a call at a telephone number for registration from the unregistered mobile station in the register mode, a function of extracting mobile station information including a mobile station ID of the unregistered mobile station that has placed the call, in accordance with the call received at the telephone number for registration, and generating registration information by associating the mobile station information with base station information including a base station ID of a host station, and a function of transmitting the registration information to a server apparatus.

In this way, the CSG type base station receives the call at the telephone number for registration from the unregistered mobile station in the register mode, extracts the mobile station information including the mobile station ID of the unregistered mobile station that has placed the call, in accordance with the call received at the telephone number for registration, generates the registration information by associating the mobile station information with base station information including the base station ID of the host station, and then transmits the registration information to the server apparatus. The user can thus register a desired mobile station at a desired server apparatus in a simple operation. Also, since a security setting using a password or the like is not needed in the registration of a mobile station that has not been registered yet, user friendliness is increased.

(11) An integrated circuit of the present invention is implemented on a CSG (Closed Subscriber Group) type base station to cause the CSG type base station to perform a plurality of functions. The functions includes a function of receiving a call at a telephone number for registration from an unregistered mobile station, a function of extracting, subsequent to the reception of the call, mobile station information including a mobile station ID of the unregistered mobile station that has placed the call, in accordance with the call received at the telephone number for registration, and generating registration information by associating the mobile station information with base station information including a base station ID of a host station, and a function of transmitting the registration information to a server apparatus in response to an operation performed by a user.

In this way, the CSG type base station receives the call at the telephone number for registration from the unregistered mobile station, extracts, subsequent to the reception of the call, the mobile station information including the mobile station ID of the unregistered mobile station that has placed the call, in accordance with the call received at the telephone number for registration, generates the registration information by associating the mobile station information with the base station information including the base station ID of the host station, and transmits the registration information to the server apparatus in response to the operation performed by the user. The user can thus register a desired mobile station at a desired server apparatus in a simple operation. Also, since a security setting using a password or the like is not needed in the registration of a mobile station that has not been registered yet, user friendliness is increased.

Advantageous Effects of Invention

In accordance with the present invention, an end user may register a mobile station at the CSG in a simple method. In such a case, the end user is free from the necessity of knowing information including the ID of the mobile station and the base station ID of the HNB, and is also free from performing the security setting using a password or the like for HNB subscription contract. As a result, user-friendliness is increased.

DESCRIPTION OF EMBODIMENTS

Disclosed herein are a mechanism and method to easily register a mobile station at CSG (Closed Subscriber Group) of HNB (Home Node B) that restricts access so that only a mobile station registered in advance is permitted to access the CSG. Embodiments of the present invention are described in detail with reference to the accompanying drawings.

Figure 1:
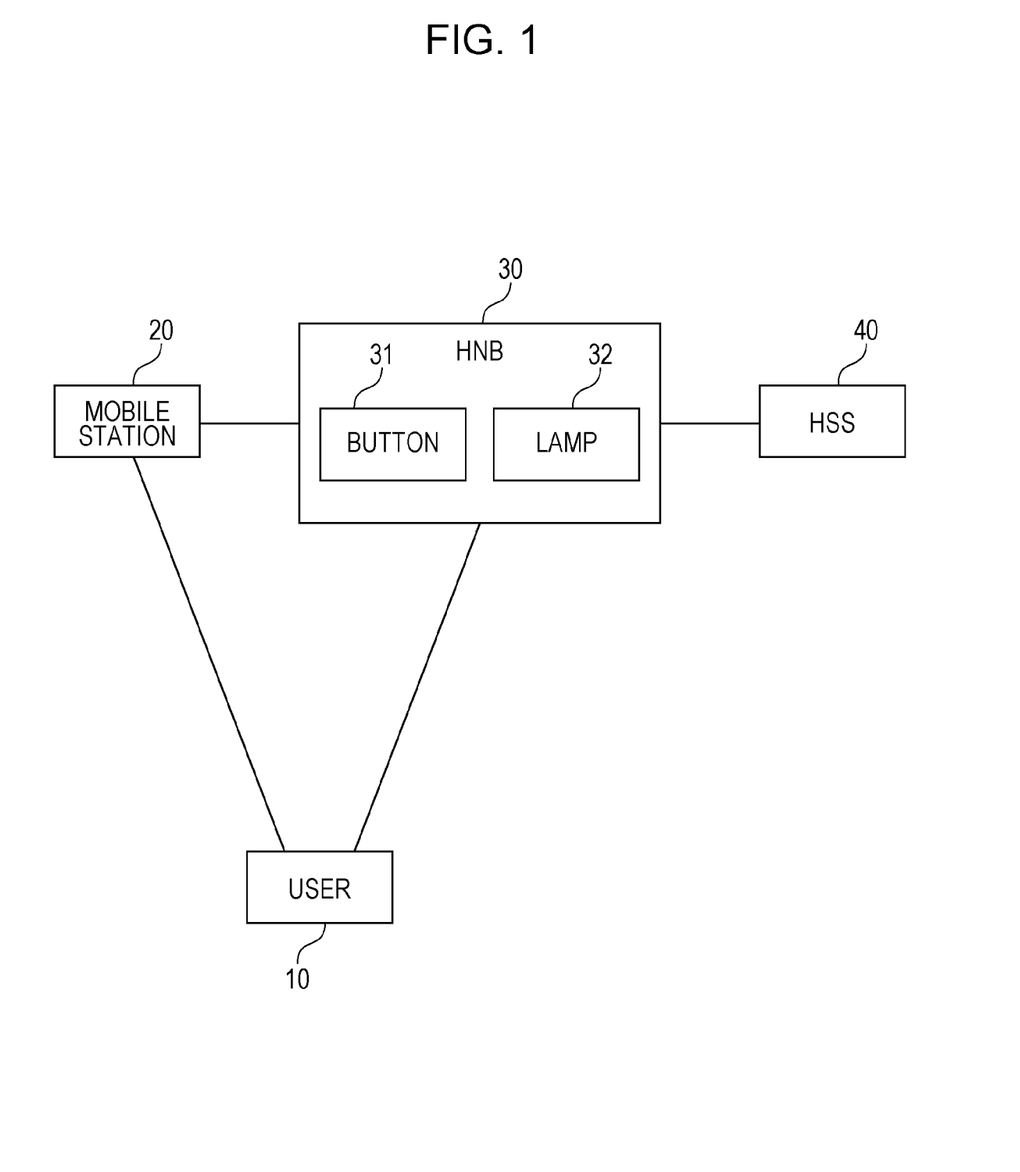
FIG. 1 is a block diagram illustrating a configuration of a mobile communication system of the present invention.

FIG. 1 is a block diagram illustrating a configuration of a mobile communication system of the present invention. As illustrated in FIG. 1, a user 10 can operate a mobile station 20, and can also operate an HNB 30 in the installation facility of the HNB 30. The mobile station 20 and the HNB 30 can transmit and receive radio signals therebetween. A Home Subscriber Server (hereinafter referred to as HSS) 40 is a database that manages subscriber information in the mobile communication system. The HSS 40 manages a list of CSG which can access the HNB 30.

The HNB 30 of the present invention includes a button 31 that is operated by the user 10 and a lamp 32 that is used by the user 10 to confirm displaying. However, these elements are illustrated for exemplary purposes only. As long as the button 31 has a function of receiving an instruction in any form from the user 10 and the lamp 32 has a function of displaying any status to the user 10, these elements satisfy the spirit of the present invention.

First Embodiment

Figure 2:
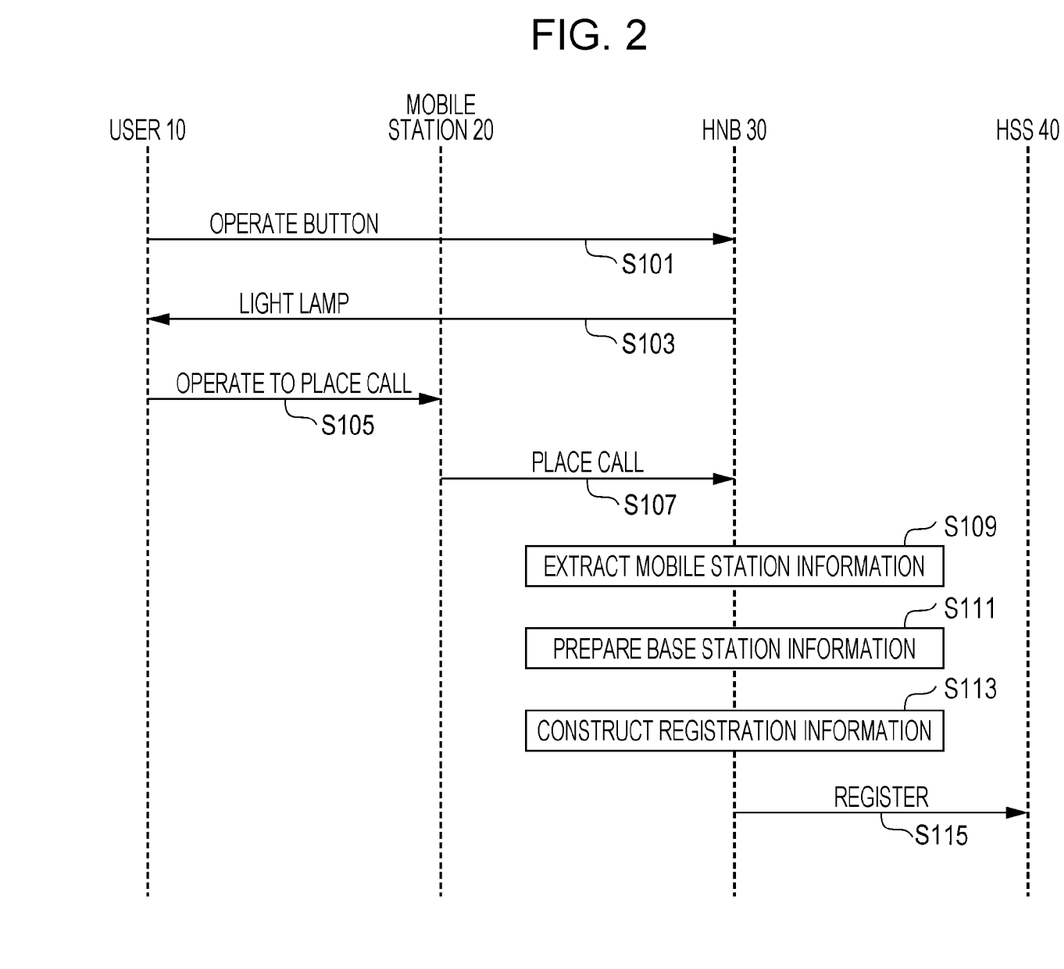
FIG. 2 is a sequence chart illustrating a procedure example to register a mobile station 20 at HSS 40 in accordance with a first embodiment of the present invention.

In order to register a mobile station 20 that has not been registered at the CSG yet, a user first operates the button 31 of the HNB 30 to set the HNB 30 to a particular operation mode to register the mobile station 20. The HNB 30 normally receives no access from the mobile station 20 that has not been registered as a CSG, but in this operation mode, the HNB 30 receives a call at a special telephone number corresponding to a registration function in the HNB 30. Upon receiving the call at the special telephone number predetermined at the particular operation mode for registration of the mobile station 20, the HNB 30 extracts, from the access, mobile station information including a mobile station ID of the mobile station 20 and registers at the HSS 40 the mobile station information together with base station information.

FIG. 2 is a sequence chart illustrating a procedure example to register a mobile station 20 at HSS 40 in accordance with a first embodiment of the present invention. In order to register at the HNB 30 the mobile station 20 that has not been registered yet at the CSG, the user 10 first operates the button 31 of the HNB 30 and configures the HNB 30 to be in the particular operation mode for registration of the mobile station 20 (step S101). The HNB 30 normally receives no access from the mobile station 20 that has not been registered as a CSG, but in this operation mode, the HNB 30 receives the call at the special telephone number prepared for the registration function. In order to indicate that the HNB 30 enters this mode, the HNB 30 lights the lamp 32, thereby displaying the particular mode to the user 10 (step S103). Note that the particular operation mode may time out if a call to be discussed later is not received within a constant period of time, and that the HNB 30 may resume a standard operation status.

Upon confirming lamp lighting (step S103) occurring in response to a button operation (step S101), the user 10 performs a call operation (step S105) at a specific telephone number predetermined by the mobile station 20. The specific telephone number predetermined is simply different from a telephone number for ordinary communication. Any telephone number may be designated by the HNB 30, but "#11" may be set herein for discussion. Upon receiving the call operation (step S105) on the specific telephone number, the mobile station 20 places a call to the HNB 30 (step S107). It is contemplated that the call of the call operation (step S105) includes as a key an ID unique to the HNB 30 written on the housing of the HNB 30 or an accompanying manual of the HNB 30.

Upon receiving the call (step S107) at the specific telephone number predetermined in the particular mode for the registration of the mobile station 20, the HNB 30 extracts from the access the mobile station information including the mobile station ID of the mobile station 20 (step S109). The HNB 30 also prepares base station information including a base station ID and the like of the HNB 30 itself (step S111), constructs registration information addressed to the HSS 40 by combining the base station information with the mobile station information (step S113), and registers the registration information (step S115). Upon completing this series of operations, the HNB 30 shifts to the standard mode and extinguishes the lamp 32.

Upon receiving the registration information, the HSS 40 updates a subscriber information database therewithin to add thereto the mobile station 20 having the mobile station ID given in a CSG list of the HNB 30 of a given base station ID. The HNB 30 references the subscriber information database and receives an access from the mobile station 20 after the subscriber information database is updated.

In the first embodiment, the HNB 30 includes the button 31 to cancel the access restriction when the mobile station 20 accesses for registration. In order to newly register the mobile station 20, the call is placed at the specific telephone number corresponding to the registration function of the HNB 30 with the access restriction canceled by the function of the button 31. The mobile station 20 having made the call operation is thus added to the list of the mobile stations 20 that are permitted to access the HNB 30 on the HSS 40 within a network. Since the HSS 40 is then provided with information including the ID of the calling mobile station 20 and the base station ID of the HNB 30 through which the call has passed, the user 10 is free from the necessity of setting these pieces of information. Since the button 31 that is arranged on the housing of the HNB 30 needs to be controlled in accordance with the procedure, the user is free from performing the security setting using a password or the like in the registration of the mobile station 20. As a result, user friendliness is increased.

Second Embodiment

In accordance with the first embodiment, the user 10 performs the button operation on the HNB 30 to set the HNB 30 to be in the particular operation mode for the registration of the mobile station 20. The registration of the mobile station 20 at the CSG is thus facilitated. In accordance with a second embodiment, the button operation by the user 10 on the HNB 30 is interpreted as authentication for the registration operation. More specifically, the function of the button 31 on the HNB 30 of FIG. 1 is different from the function of the button 31 in the first embodiment.

Figure 3:
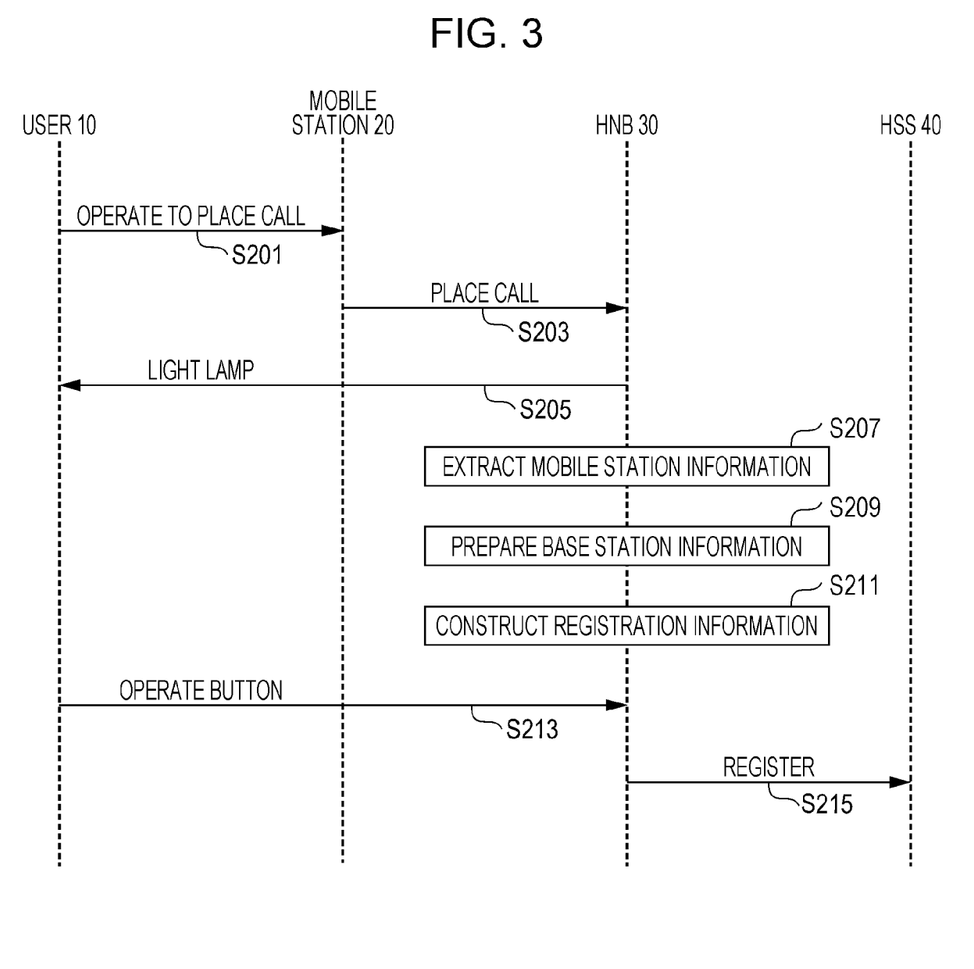
FIG. 3 is a sequence chart illustrating a procedure example to register the mobile station 20 at the HSS 40 in accordance with a second embodiment of the present invention (an example with a button operation for registration verification).

FIG. 3 is a sequence chart illustrating a procedure example to register the mobile station 20 at the HSS 40 in accordance with the second embodiment of the present invention (an example with a button operation for registration verification). The user 10 performs a call operation on the HNB 30 at a specific telephone number predetermined first by the mobile station 20 (step S201). The HNB 30 is a CSG cell and does not receive a standard access from the mobile station 20, but usually receive an access at the specific telephone number. It is contemplated that the call of the call operation (step S201) includes as a key an ID unique to the HNB 30 written on the housing of the HNB 30 or an accompanying manual of the HNB 30.

In response to the reception of the call (step S203), the HNB 30 lights the lamp 32 to prompt the user 10 to perform the button operation (step S205) and thus causes the user 10 to verify that the user 10 accepts the registration of the mobile station 20. The HNB 30 also extracts from the access from the mobile station 20 the mobile station information including the mobile station ID of the mobile station 20 (step S207). The HNB 30 prepares the base station information including the base station ID of the HNB 30 itself (step S209), and thus constructs the registration information addressed to the HSS 40 by combining the base station information and the mobile station information (step S211). In order to verify the registration of the mobile station 20, the user 10 performs the button operation (step S213). If no button operation is performed within a constant period of time (step S213), and the verification of the registration of the mobile station 20 by the user 10 is not confirmed, the HNB 30 may time out in a verification period, quit the registration, and resume a standard operation status. Subsequent to the button operation by the user 10 (step S213), the HNB 30 registers the registration information on the HSS 40 (step S215). Upon completing this series of operations, the HNB 30 shifts to the standard mode and extinguishes the lamp 32.

In accordance with the second embodiment, the button operation performed by the user 10 on the HNB 30 is interpreted as verification of the registration operation. In this way, the registration verification necessitates the user's controlling the button 31 arranged on the housing of the HNB 30 and the user 10 is freed from performing the security setting using the password or the like in the registration of the mobile station 20. As a result, user friendliness to the user 10 is increased.

Third Embodiment

Security seems to be sufficiently ensured in the first and second embodiments by taking steps including operating the button 31 or the like arranged on the HNB 30 in a building having the HNB 30 installed therewithin. Furthermore, it is also contemplated that additional verification steps include a step of transmitting a mail, a voice communication, or the other means to the management subscriber 50 associated with the HNB 30 to verify whether to accept the registration. More specifically, the functions of the button 31, the lamp 32 and the like in a third embodiment are substantially identical to those of the second embodiment.

Figure 4:
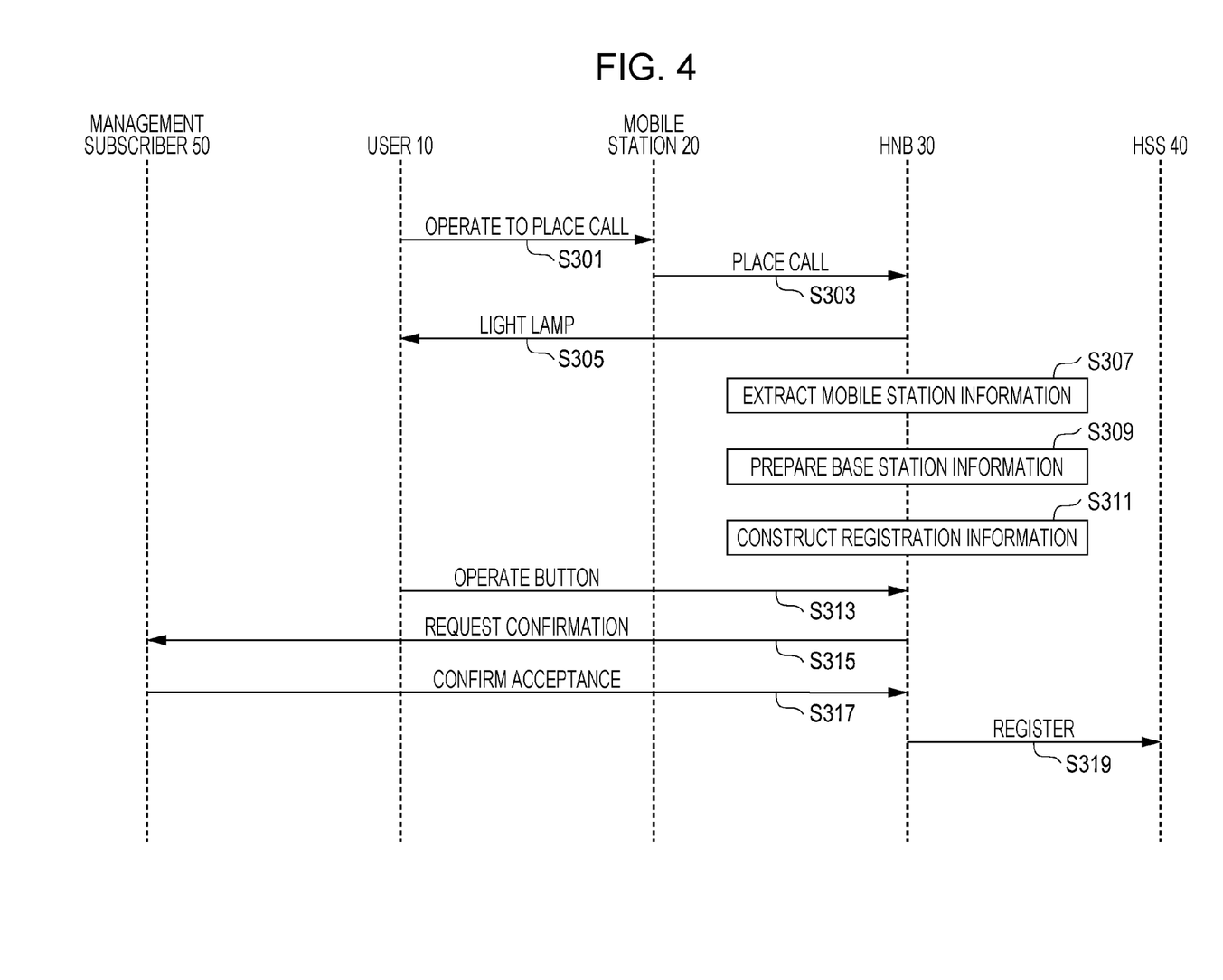
FIG. 4 is a sequence chart illustrating a procedure example to register the mobile station 20 at the HSS 40 in accordance with a third embodiment of the present invention (an example inclusive of a verification procedure of a management subscriber 50).

FIG. 4 is a sequence chart illustrating a procedure example to register the mobile station 20 at the HSS 40 in accordance with the third embodiment of the present invention (an example inclusive of a verification procedure of the management subscriber 50). FIG. 4 illustrates an example in which an additional step by the management subscriber 50 is included in the second embodiment. The user 10 performs a call operation to the HNB 30 at a specific telephone number predetermined by the mobile station 20 (step S301). Upon receiving the call (step S303), the HNB 30 lights the lamp 32 to prompt the user 10 to perform the button operation in order to verify whether the user 10 accepts the registration of the mobile station 20 (step S305). The HNB 30 also extracts from the access from the mobile station 20 the mobile station information including the mobile station ID of the mobile station 20 (step S307), prepares the base station information including the base station ID of the HNB 30 itself (step S309), and constructs the registration information addressed to the HSS 40 by combining the base station information with the mobile station information (step S311).

In order to verify the registration of the mobile station 20, the user 10 performs the button operation (step S313). If no button operation is performed within a constant period of time (step S313), and the verification of the registration of the mobile station 20 by the user 10 is not confirmed, the HNB 30 may time out in a verification period, quit the registration, and resume the standard operation status. Subsequent to the button operation by the user 10 (step S313), the HNB 30 notifies the management subscriber 50 that a mobile station 20 has been newly registered and checks with the management subscriber 50 to verify whether the registration is to be accepted (step S315). If the management subscriber 50 returns an acceptance reply (step S317), the HNB 30 transmits the registration information to the HSS 40 and registers the mobile station 20 at the CSG (step S319). Upon completing this series of operations, the HNB 30 shifts to the standard mode and extinguishes the lamp 32.

Figure 5:
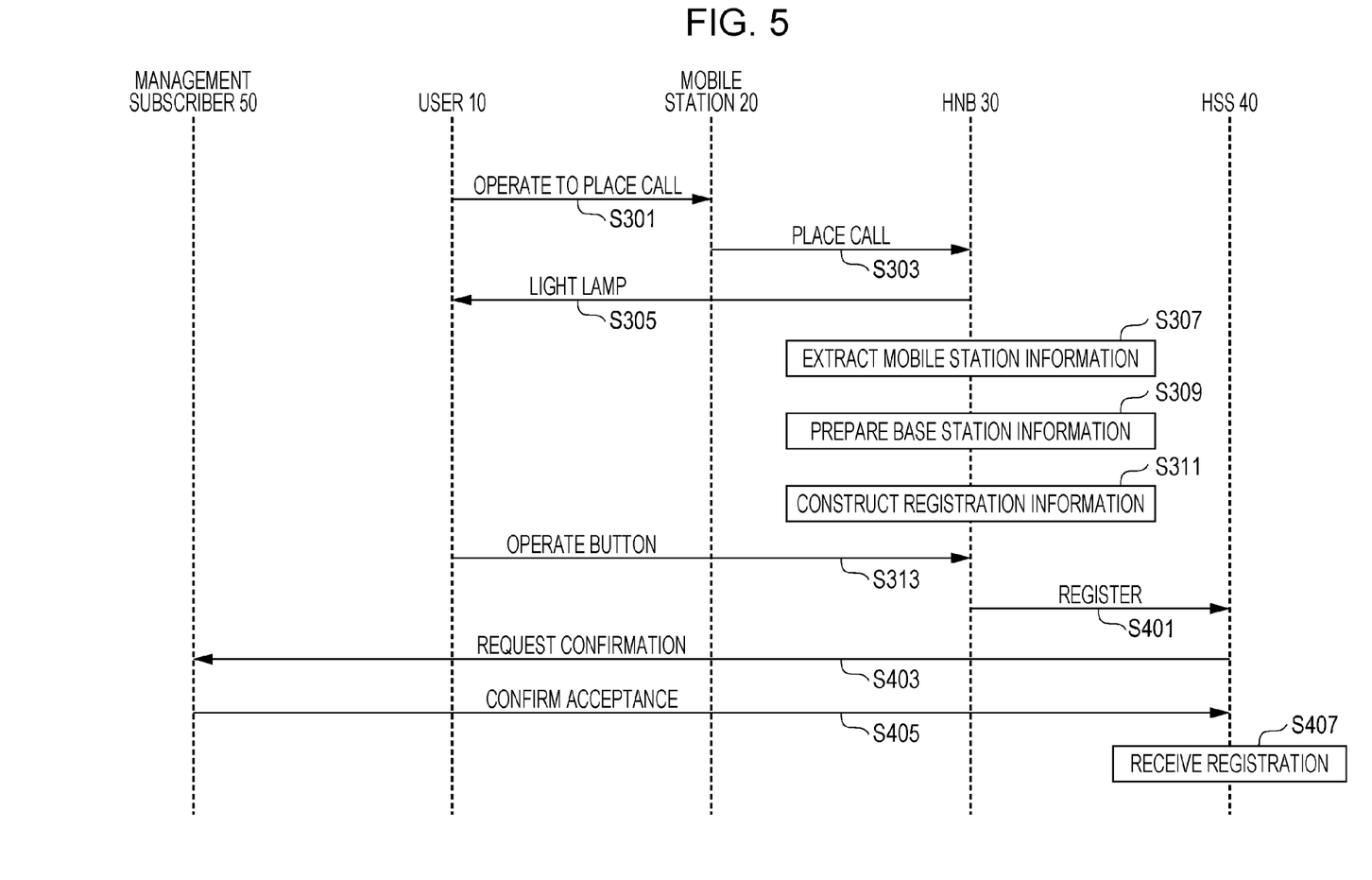
FIG. 5 is another sequence chart illustrating a procedure example to register the mobile station 20 at the HSS 40 in accordance with the third embodiment of the present invention (an example inclusive of a verification procedure of a management subscriber 50).

It is also contemplated that the HSS 40 performs the verification process on the management subscriber 50 in the third embodiment of the present invention. FIG. 5 is another sequence chart illustrating a procedure example to register the mobile station 20 at the HSS 40 in accordance with the third embodiment of the present invention (an example inclusive of a verification procedure of a management subscriber 50). FIG. 5 illustrates an example in which the HSS 40 performs the verification procedure of the addition by the management subscriber 50 subsequent to the registration procedure of the second embodiment. After the HNB 30 registers at the HSS 40 in the second embodiment (step S401), the HSS 40 notifies the management subscriber 50 that a new mobile station 20 has been registered and requests the management subscriber 50 to verify that the management subscriber 50 accepts the registration (step S403). If the management subscriber 50 returns an acceptance reply (step S405), the HSS 40 determines that the verification has been completed, and then receives the registration, and updates the database of the HSS 40 in accordance with the registration from the HNB 30 in step S401 (step S407). If no acceptance reply has been received from the management subscriber 50 for a specific period of time, the registration from the HNB 30 in step S401 is discarded, and the database is not updated.

Furthermore, the third embodiment further includes as an additional verification step a step of transmitting a mail, a voice communication, or the other means to the management subscriber 50 associated with the HNB 30 to request the management subscriber 50 to verify whether the management subscriber 50 accepts the registration. In this way, security level is increased.

Fourth Embodiment

In the discussion of the procedure of the first, second, and third embodiments, a mobile station 20 that has not belonged to the CSG is registered at the CSG. The mobile station 20 that has already been registered at the CSG may be deleted from the CSG in a similar procedure. In such a case, a telephone number corresponding to each function, different from the specific telephone number corresponding to the registration function of the HNB 30 as the calling telephone number to the HNB 30, may be used. These telephone numbers predetermined may be simply different from a telephone number for ordinary communication. Any telephone number may be designated by the HNB 30, and "#11" may be set for the registration and "#12" may be set for the deletion, for example. A fourth embodiment is different from the first through third embodiments in the functions of the button 31 and the lamp 32 in the configuration of the HNB 30 of FIG. 1.

Figure 6:
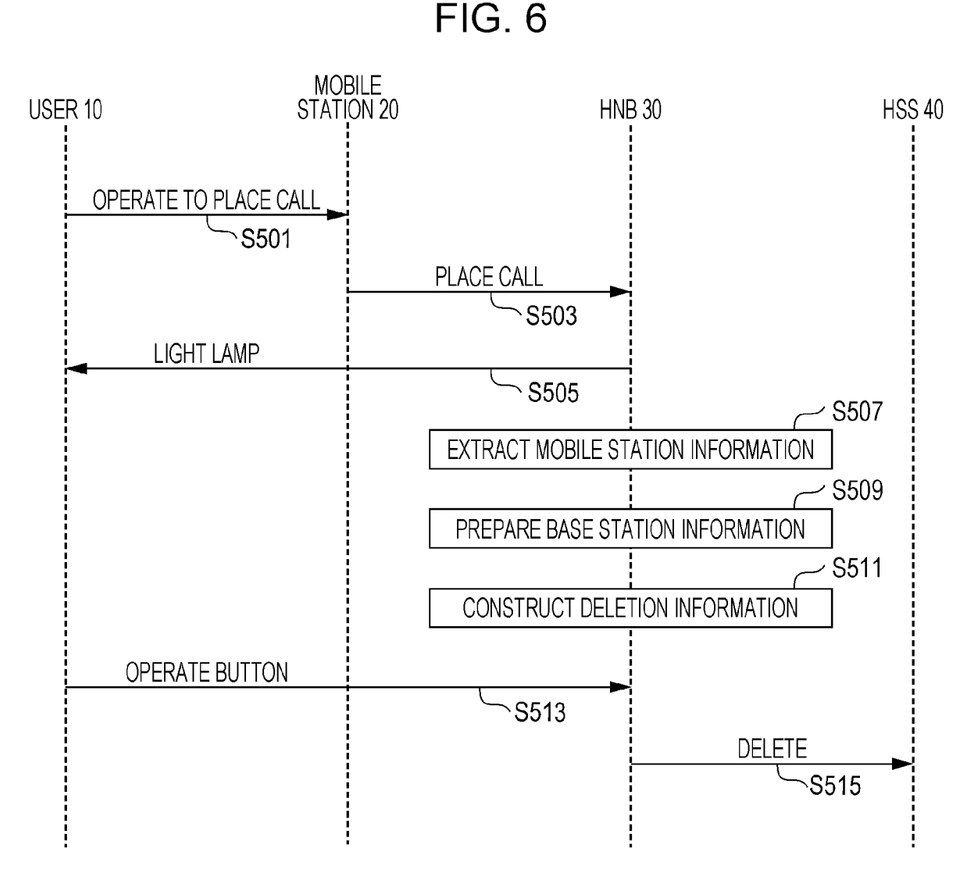
FIG. 6 is a sequence chart illustrating a procedure example to delete the mobile station 20 registered at the CSG in accordance with a fourth embodiment of the present invention.

FIG. 6 is a sequence chart illustrating a procedure example to delete the mobile station 20 registered at the CSG in accordance with the fourth embodiment of the present invention. FIG. 6 illustrates an example in which the HNB 30 deletes the mobile station 20 from the CSG in a procedure similar to the procedure of the second embodiment. The user 10 performs a call operation on the HNB 30 at a specific telephone number predetermined first by the mobile station 20 (step S501). In response to the reception of the call (step S503), the HNB 30 lights the lamp 32 to prompt the user 10 to perform the button operation (step S505) to request the user 10 to verify whether the user 10 deletes the registration of the mobile station 20. The HNB 30 also extracts from the access from the mobile station 20 the mobile station information including the mobile station ID of the mobile station 20 (step S507). The HNB 30 prepares the base station information including the base station ID of the HNB 30 itself (step S509), and thus constructs the registration information addressed to the HSS 40 by combining the base station information and the mobile station information (step S511).

If the mobile station 20 is to be deleted, the user 10 performs the button operation (step S513). If no button operation is performed within a constant period of time (step S513), and the verification of the deletion of the mobile station 20 by the user 10 is not confirmed, the HNB 30 may time out in a verification period, quit the deletion, and resume the standard operation status. Subsequent to the button operation by the user 10 (step S513), the HNB 30 transmits deletion information to the HSS 40 and deletes the mobile station 20 from the CSG (step S515). Upon completing this series of operations, the HNB 30 shifts to the standard mode and extinguishes the lamp 32.

In accordance with the fourth embodiment, the mobile station 20 that has been registered at the CSG can be deleted in the procedure of the second embodiment. In this way, the HNB 30 not only registers the mobile station 20 to the CSG but also deletes the mobile station 20 from the CSG in a simple operation. As a result, user friendliness to the user 10 is increased.

Fifth Embodiment

In the discussion of the procedures of the first, second and third embodiments, a mobile station 20 that has not belonged to the CSG is registered at the CSG. The verification of the registration status of the current CSG and the modification of part of the current CSG may be carried out in a similar procedure. In such a case, a telephone number corresponding to each function, different from the specific telephone number corresponding to the registration function of the HNB 30 as the calling telephone number to the HNB 30, may be prepared. These telephone numbers predetermined may be simply different from a telephone number for ordinary communication. Any telephone number may be designated by the HNB 30, and "#11" may be set for the registration and "#13" may be set for the verification and modification, for example. A fifth embodiment is different from the first through fourth embodiments in the functions of the button 31 and the lamp 32 in the configuration of the HNB 30 of FIG. 1.

Figure 7:
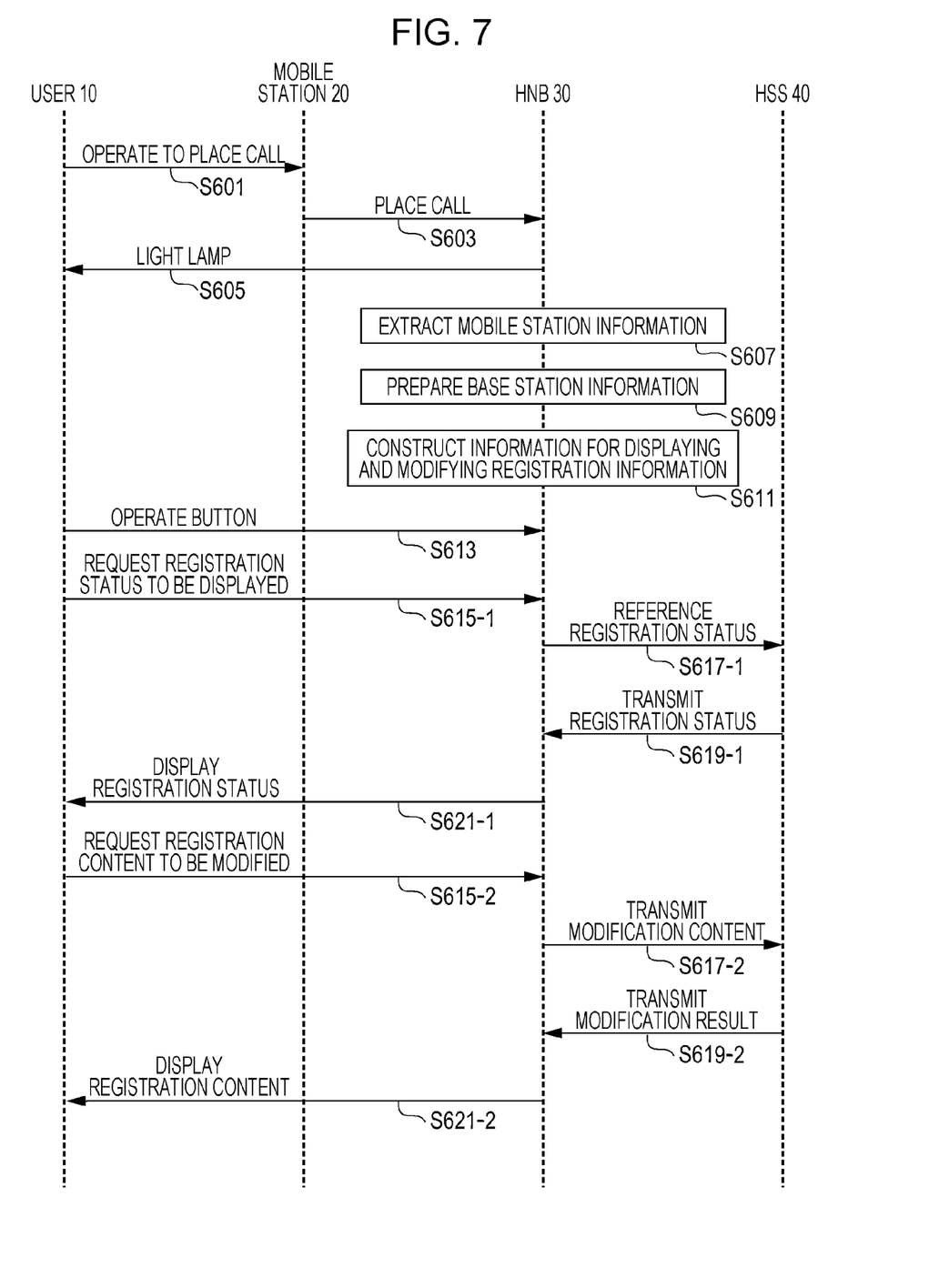
FIG. 7 is a sequence chart illustrating a procedure example to verify and correct registration information of the CSG in accordance with a fifth embodiment of the present invention.

FIG. 7 is a sequence chart illustrating a procedure example to verify and correct registration information of the CSG in accordance with the fifth embodiment of the present invention. FIG. 7 illustrates an example in which the HNB 30 verifies or corrects the registration information of the mobile station 20 at the CSG in a procedure similar to the procedure of the second embodiment. The user 10 performs a call operation on the HNB 30 at a specific telephone number predetermined first by the mobile station 20 (step S601). In response to the reception of the call (step S603), the HNB 30 lights the lamp 32 to prompt the user 10 to perform the button operation (step S605) to request the user 10 to confirm whether the user 10 verifies or corrects the registration information of the mobile station 20. The HNB 30 also extracts from the access from the mobile station 20 the mobile station information including the mobile station ID of the mobile station 20 (step S607). The HNB 30 prepares the base station information including the base station ID of the HNB 30 itself (step S609), and thus constructs information for use in displaying and modifying the registration information addressed to the HSS 40 by combining the base station information with the mobile station information (step S611).

When the registration information of the mobile station 20 is to be verified or corrected, the user 10 performs the button operation (step S613). If no button operation is performed within a constant period of time (step S613), and the authentication related to the verification and the correction of the registration information of the mobile station 20 by the user 10 is not confirmed, the HNB 30 may time out in a verification period, quit the verification or correction of the registration information, and resume the standard operation status. Subsequent to the button operation by the user 10 (step S613), the HNB 30 performs a verification operation and a correction operation on the registration content. In response to a display request of the registration status from the user 10 (step S615-1), the HNB 30 references the registration information of the HSS 40 (step S617-1). The HSS 40 transmits the registration status to the HNB 30 (step S619-1), and the HNB 30 notifies the user 10 of the registration status (step S621-1). Also, in response to a content modification request from the user 10 (step S615-2), the HNB 30 transmits modification information to the HSS 40 (step S617-2), and the HSS 40 modifies the registration content, and transmits a modification result to the HNB 30 (step S619-2). The HNB 30 displays modified registration content to the user 10 (step S621-2). A variety of methods, including an audio guidance or a mail, is considered to display the updated registration content to the user 10.

In accordance with the fifth embodiment, the verification of the registration status of the current CSG and the modification of part of the content of the current CSG may be performed in the same procedure as the second embodiment. The user 10 can thus easily verify and modify the registration information of the mobile station 20 at the CSG. As a result, user friendliness to the user 10 is increased.

Figure 8:
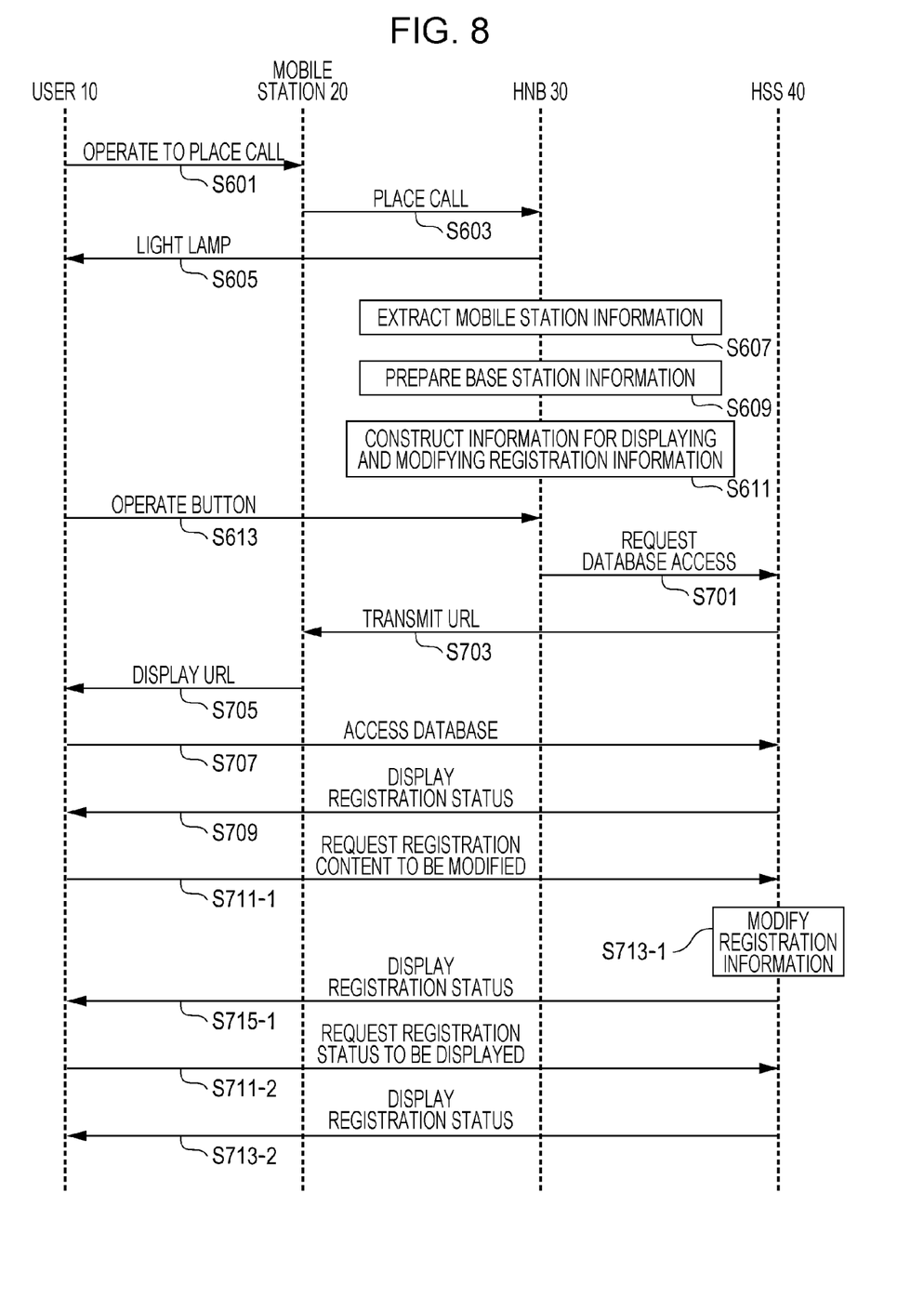
FIG. 8 is another sequence chart illustrating a procedure example to verify and correct the registration information with the mobile station 20 enabled to access a database of the HSS 40 in accordance with the fifth embodiment of the present invention.

It is also contemplated that the procedure to verify or correct the registration information of the CSG is performed by the HSS 40 in the fifth embodiment. FIG. 8 is another sequence chart illustrating a procedure example to verify and correct the registration information with the mobile station 20 enabled to access a database of the HSS 40 in accordance with the fifth embodiment of the present invention. Subsequent to the button operation by the user 10 (step S613), the HNB 30 notifies the HSS 40 that the mobile station 20 has requested a secure database access (step S701). The HSS 40 permits the mobile station 20 to access the database through means, such as transmitting via a mail a URL for use in the secure database access (step S703). The mobile station 20 displays the URL to the user 10 (step S705). The user 10 then accesses the URL provided for the secure database access and is thus enabled to directly access the database (step S707), and the HSS 40 displays the registration status to the user 10 (step S709). In response to a content modification request from the user 10 (step S711-1), the HSS 40 modifies the registration content (step S713-1), and transmits a modification result to the user 10 (step S715-1). Upon receiving a display request to display the registration status from the user 10 (step S711-2), the HSS 40 displays the registration information thereof (step S713-2).

Sixth Embodiment

The mobile station 20 accessible to the CSG is dynamically managed by facilitating the registration of the mobile station 20 to the CSG as described above. In that case, however, an upper limit to the number of mobile stations that can be registered at a single CSG becomes a problem. The number of mobile stations 20 already registered may have reached the upper limit in the registration procedure in the first, second, and third embodiments. In such a case, as described below, a sixth embodiment provides additional procedures including discontinuing a new registration, and selecting a mobile station 20 to be deleted from among the registered mobile stations 20.

In a new registration with the registration count reaching the upper limit of the registerable number of mobile stations, a step first contemplated is (1) discontinuing registration of new mobile stations 20. The following steps may also be contemplated to cancel a registered mobile station 20 from registration.

(2) prioritizing the mobile stations 20 in the order with a higher priority placed on a mobile station 20 having used the HNB 30 more recently and deleting a mobile station 20 having a lower priority.

(3) prioritizing the mobile stations 20 in the order of registration, for example, with a higher priority placed on an older registration than on a younger registration, or with a higher priority placed on a younger registration than on an older registration, and then deleting a mobile station 20 having a lower priority.

(4) prioritizing the mobile stations 20 in the order with a higher priority placed on a mobile station 20 having a higher count of registrations and then deleting a mobile station 20 having a lower priority.

(5) classifying the mobile stations 20 into two classes, cancelable mobile stations 20 and uncancelable mobile stations 20, and performing the above step (3) or (4). For example, the two classes may be determined during the registration, by preparing two different types of telephone numbers for registration.

In accordance with the sixth embodiment, if the number of mobile stations 20 already registered has reached the upper limit in the registration procedure, the additional procedures are performed including discontinuing a new registration or selecting a mobile station 20 to be deleted from among the registered mobile stations 20. The mobile stations 20 are thus appropriately registered on the HSS 40 in view of the upper limit to the registerable number of mobile stations.

A program running on the mobile station 20, the HNB 30, and the HSS 40 of the present invention is a program that controls a CPU (a program for causing a computer to function) in a manner such that the functions of the embodiments of the present invention are implemented. Information handled by the devices may be temporarily stored on a RAM during process, and then stored on a variety of ROMs or HDD. The information may be read, corrected, or written by the CPU as necessary. Recording media storing the program may include semiconductor memories (such as a ROM or a non-volatile memory card), optical recording media (such as DVD, MO, MD, CD, or BD), and magnetic recording media (such as a magnetic tape or a flexible disk).

The functions of the embodiments are implemented by executing the loaded program. The functions of the invention may also be implemented in conjunction with an operating system or another application program in response to an instruction of the program. To circulate the program in the market, the program may be supplied in a stored state on a portable recording medium, or is transferred to a server computer via a network such as the Internet. In such a case, a storage device in the server computer also falls within the scope of the present invention.

Whole or part of the mobile station 20, the HNB 30, and the HSS 40 may be implemented as LSI as a typical integrated circuit. Each function block in the mobile station 20, the HNB 30, and the HSS 40 may be individually integrated into a chip. Alternatively, all or some of the function blocks may be integrated into a chip. The integrated form may not be limited to LSI. The integrated form may be a dedicated circuit, or a general-purpose processor. If a technique of circuit integration replacing the LSI appears with the advance of semiconductor technique, an integrated circuit resulting from the technique may also be used.

REFERENCE SIGNS LIST

10 User
20 Mobile station
30 HNB
31 Button
32 Lamp
40 HSS
50 Management subscriber

The invention claimed is:

1. A CSG (Closed Subscriber Group) base station that restricts an access from a mobile station that has not been registered yet, comprising:

switching circuitry which, in response to an instruction detected by an input device of the base station, switches between a standard mode that permits an access from a mobile station that has been registered in advance while restricting an access from an unregistered mobile station and a register mode that permits an access from an unregistered mobile station that intends to be registered, receiving circuitry which receives a call at a telephone number for registration from the unregistered mobile station in the register mode, extracting circuitry which extracts mobile station information including a mobile station ID of the unregistered mobile station that has placed the call, in accordance with the call received at the telephone number for registration, and which generates registration information by associating the mobile station information with CSG base station information including a CSG base station ID as a host station, and transmission circuitry which transmits the registration information to a server apparatus.

2. A CSG (Closed Subscriber Group) base station that restricts an access from a mobile station that has not been registered yet, comprising:

receiving circuitry which receives a call at a telephone number for registration from an unregistered mobile station, extracting circuitry which extracts, subsequent to the reception of the call, mobile station information including a mobile station ID of the unregistered mobile station that has placed the call, in accordance with the call received at the telephone number for registration, and which generates registration information by associating the mobile station information with CSG base station information including a CSG base station ID as a host station, and transmission circuitry which transmits the registration information to a server apparatus in response to an instruction detected by an input device of the base station.

3. The CSG type base station according to claim 1, wherein the transmission circuitry:

transmits to an administrator terminal, registration verification request information requesting registration verification prior to transmitting the registration information to the server apparatus, and transmits the registration information to the server apparatus only in response to reception of registration permit information to permit a registration from the administrator terminal.

4. The CSG type base station according to claim 1, wherein the receiving circuitry receives in the register mode a call from a mobile station at a telephone number for deletion, a telephone number for verification, or a telephone number for modification, the extracting circuitry extracts the mobile station information of the mobile station that has placed the call, in accordance with the call received at the telephone number for deletion, the telephone number for verification, or the telephone number of modification, and generates deletion information, verification information, or modification information by associating the mobile station information with the base station information, and the transmission circuitry transmits to the server apparatus the deletion information, the verification information, or the modification information.

5. The CSG type base station according to claim 2, wherein the receiving circuitry receives a call from a mobile station at a telephone number for deletion, a telephone number for verification, or a telephone number for modification, the extracting circuitry extracts, subsequent to receiving the call, mobile station information of the mobile station that has placed the call, in accordance with the call received at the telephone number for deletion, the telephone number for verification, or the telephone number for modification, and generates deletion information, verification information, or modification information by associating the mobile station information with the base station information, and the transmission circuitry transmits to the server apparatus the deletion information, the verification information, or the modification information in response to an instruction detected by the input device of the base station.

6. The CSG type base station according to claim 1, wherein the switching circuitry switches to the standard mode in a case of no reception of the call within a constant period of time subsequent to switching to the register mode.

7. The CSG type base station according to claim 2, wherein the transmission circuitry stops transmission of the registration information subsequent to receiving the call in a case of no operation performed by the user within a constant period of time subsequent to the reception of the call.

8. A communication method for a CSG (Closed Subscriber Group) base station that restricts an access from a mobile station that has not been registered yet, the communication method comprising:

switching in response to an instruction detected by an input device of the base station between a standard mode that permits an access from a mobile station that has been registered in advance while restricting an access from an unregistered mobile station and a register mode that permits an access from an unregistered mobile station that intends to be registered;

receiving a call at a telephone number for registration from the unregistered mobile station in the register mode;

extracting mobile station information including a mobile station ID of the unregistered mobile station that has placed the call, in accordance with the call received at the telephone number for registration;

generating registration information by associating the mobile station information with CSG base station information including a CSG base station ID as a host station; and transmitting the registration information to a server apparatus.

9. The communication method for a CSG type base station according to claim 8, further comprising:

transmitting, to an administrator terminal, registration verification request information requesting registration verification prior to transmitting the registration information to the server apparatus; and transmitting the registration information to the server apparatus only in response to reception of registration permit information to permit a registration from the administrator terminal.

10. The communication method for a CSG type base station according to claim 8, further comprising:

receiving in the register mode a call from a mobile station at a telephone number for deletion, a telephone number for verification, or a telephone number for modification;

extracting the mobile station information of the mobile station that has placed the call, in accordance with the call received at the telephone number for deletion, the telephone number for verification, or the telephone number of modification;

generating deletion information, verification information, or modification information by associating the mobile station information with the base station information; and transmitting to the server apparatus the deletion information, the verification information, or the modification information.

11. The communication method for a CSG type base station according to claim 8, further comprising switching to the standard mode in a case of no reception of the call within a constant period of time subsequent to switching to the register mode.

* * * * *